P. PAULY.
EMERGENCY ATTACHMENT FOR DRIVING AXLES OF AUTOMOBILES AND THE LIKE.
APPLICATION FILED MAY 1, 1916.
1,206,728. Patented Nov. 28, 1916.
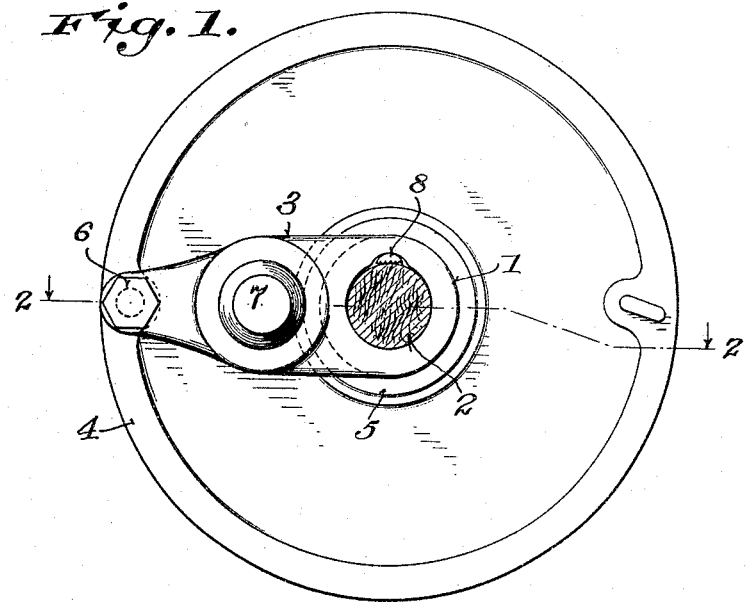
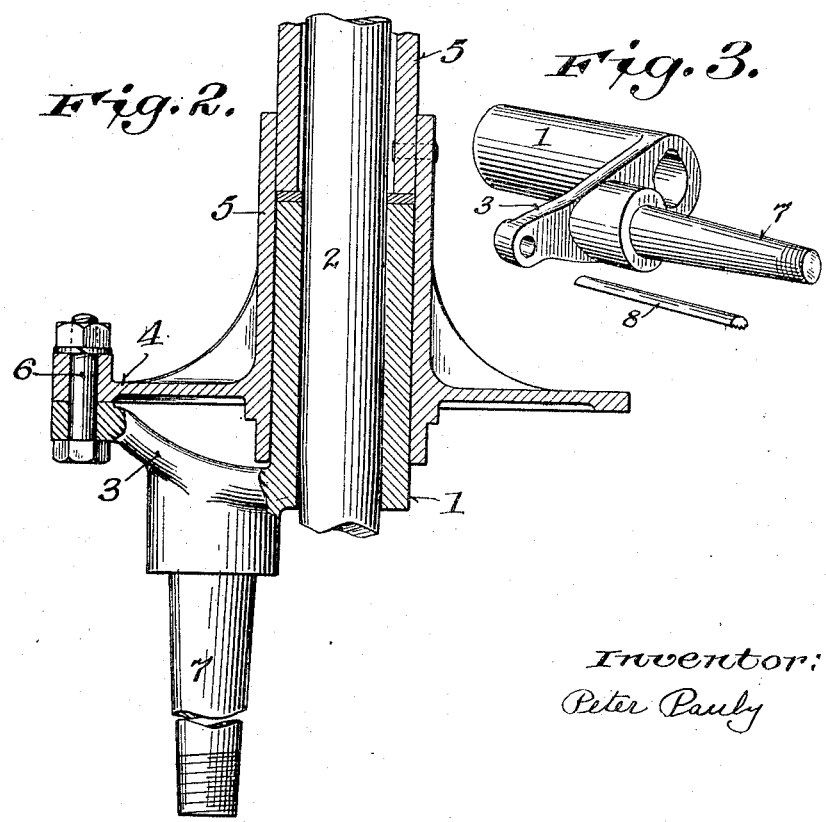
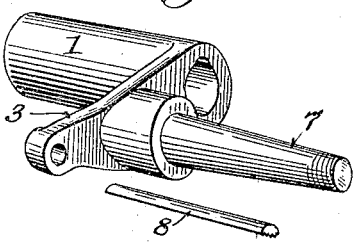
Inventor:
Peter Pauly

UNITED STATES PATENT OFFICE.

PETER PAULY, OF MILWAUKEE, WISCONSIN, ASSIGNOR OF ONE-HALF TO ALFRED A. LIENEMANN, OF MILWAUKEE, WISCONSIN.

EMERGENCY ATTACHMENT FOR DRIVING-AXLES OF AUTOMOBILES AND THE LIKE.

1,206,728.  Specification of Letters Patent.  Patented Nov. 28, 1916.

Application filed May 1, 1916. Serial No. 94,599.

*To all whom it may concern:*

Be it known that I, PETER PAULY, a citizen of the United States, residing at Milwaukee, in the county of Milwaukee and State of Wisconsin, have invented a new and useful Emergency Attachment for Driving-Axles of Automobiles and the like, of which the following is a specification.

This invention relates to an emergency attachment for the drive axle of automobiles and the like, having a differential drive, in which the wheels are mounted on the axle shafts and has for its main objects to provide means for preventing the rotation of an axle shaft from which the wheel spindle has been broken and to provide another spindle onto which the wheel may be mounted to support the broken end of the axle.

An axle having a differential drive has its shaft in two parts each geared to the drive shaft in a well known manner and need not be described. In axles of this type only the shaft having the least resistance will revolve so that when a wheel spindle is broken from one shaft that shaft having no resistance will be the only one to revolve.

To drive an automobile, or the like, in this condition on its own power, it is necessary to prevent the rotation of the broken shaft so that the other shaft and wheel will do the driving and it is also necessary to elevate the broken end of the axle by some suitable means, an attached wheel spindle on which to remount the wheel being preferred.

These objects are accomplished by my device which is clearly described in the following specification reference being had to the accompanying drawings in which—

Figure 1 is a side view of my emergency attachment applied to an axle; Fig. 2 is a section on the line 2—2 of Fig. 1; and Fig. 3 is a perspective view of the attachment the key being shown removed.

To mount my emergency attachment to an axle, the brake drum and roller cage are removed and the sleeve 1 of the attachment slipped onto the shaft 2 in place of the roller cage. The sleeve is provided with an arm 3 the outer end of which is secured to the brake flange 4 of the housing 5 by a bolt 6. A wheel spindle 7 extends from the arm 3 onto which a wheel may be mounted to support the broken end of the axle. The shaft 2 is prevented from rotating in the sleeve 1 by the key 8.

Minor details of construction may be made without departing from the spirit or scope of the invention as defined in the appended claims.

I claim:

1. An emergency attachment for an axle of the differential type from which the wheel spindle has been broken consisting of a member adapted to be attached to a non-rotating part associated with the axle and provided with a wheel spindle, offset from the axis of the shaft section, and a sleeve adapted to be slipped onto the shaft section, said sleeve being provided with a groove or channel in its face adjacent the shaft for the introduction of means to lock the shaft to the sleeve.

2. An emergency attachment for an axle of the differential type from which the wheel spindle has been broken consisting of a member adapted to be attached to a non-rotating part associated with the axle and provided with a wheel spindle, offset from the axis of the shaft section, and a sleeve having a passage therethrough, open at both ends, into which the shaft section is adapted to be slipped and means for locking the sleeve and shaft section together.

3. An emergency attachment for an axle of the differential type from which the wheel spindle has been broken consisting of a member adapted to be bolted to the brake flange of the axle and provided with a wheel spindle extending from one side thereof and a sleeve extending from the other side thereof said sleeve adapted to be slipped onto the broken shaft and keyed thereto to prevent its rotation.

PETER PAULY.

Copies of this patent may be obtained for five cents each, by addressing the "Commissioner of Patents, Washington, D. C."